United States Patent
Hojo et al.

(10) Patent No.: US 12,294,066 B2
(45) Date of Patent: *May 6, 2025

(54) METHOD FOR GENERATING SMOKE IN CELL PACK

(71) Applicant: TOYOTA JIDOSHA KABUSHIKI KAISHA, Toyota (JP)

(72) Inventors: Takayuki Hojo, Nagoya (JP); Akira Kiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,096

(22) Filed: Mar. 8, 2024

(65) Prior Publication Data

US 2024/0213556 A1  Jun. 27, 2024

Related U.S. Application Data

(63) Continuation of application No. 18/244,683, filed on Sep. 11, 2023, which is a continuation of application (Continued)

(30) Foreign Application Priority Data

May 2, 2017  (JP) ................. 2017-091675

(51) Int. Cl.
*H01M 10/42*  (2006.01)
*H01G 9/008*  (2006.01)
(Continued)

(52) U.S. Cl.
CPC ........ *H01M 10/4285* (2013.01); *H01G 9/008* (2013.01); *H01G 9/08* (2013.01);
(Continued)

(58) Field of Classification Search
None
See application file for complete search history.

(56) References Cited

U.S. PATENT DOCUMENTS 11,799,139 B2 * 10/2023 Hojo ................ H01G 11/74
2008/0143337 A1  6/2008 Fujikawa
(Continued)

FOREIGN PATENT DOCUMENTS

| CN | 101553950 A | 10/2009 |
| CN | 103004003 A | 3/2013 |

(Continued)

OTHER PUBLICATIONS

JP-2006294531-A Translation from Espacenet (Year: 2006).*

*Primary Examiner* — Nathanael T Zemui
(74) *Attorney, Agent, or Firm* — Sughrue Mion, PLLC

(57) ABSTRACT

A method for generating smoke in a cell pack by which a very small amount of smoke can be generated from a specific single unit cell among unit cells constituting the cell pack. The method causes smoke generation in a cell pack in which unit cells are connected and which includes a positive electrode output terminal for electrically connecting the positive electrode terminal of the unit cell and an external device, and a negative electrode output terminal for electrically connecting the negative electrode terminal of the unit cell and an external device. By attaching a heating means to the negative electrode output terminal, the electrode body of a specific single unit cell is heated through the negative electrode output terminal to which the heating means is attached. As a result, it is possible to cause the generation of a small amount of smoke from the specific single unit cell.

4 Claims, 4 Drawing Sheets

Related U.S. Application Data

No. 15/967,677, filed on May 1, 2018, now Pat. No. 11,799,139.

(51) Int. Cl.

| | | |
|---|---|---|
| *H01G 9/08* | (2006.01) | |
| *H01G 9/14* | (2006.01) | |
| *H01G 11/14* | (2013.01) | |
| *H01G 11/74* | (2013.01) | |
| *H01G 11/78* | (2013.01) | |
| *H01M 10/0525* | (2010.01) | |
| *H01M 10/0587* | (2010.01) | |
| *H01M 10/48* | (2006.01) | |
| *H01M 50/55* | (2021.01) | |
| *H01M 50/553* | (2021.01) | |
| *H01M 50/562* | (2021.01) | |
| *H01M 50/581* | (2021.01) | |

(52) U.S. Cl.
CPC ............... *H01G 9/14* (2013.01); *H01G 11/14* (2013.01); *H01G 11/74* (2013.01); *H01G 11/78* (2013.01); *H01M 10/48* (2013.01); *H01M 10/482* (2013.01); *H01M 50/55* (2021.01); *H01M 50/553* (2021.01); *H01M 50/562* (2021.01); *H01M 50/581* (2021.01); *H01M 10/0525* (2013.01); *H01M 10/0587* (2013.01); *H01M 2200/10* (2013.01)

(56) References Cited

U.S. PATENT DOCUMENTS

| | | |
|---|---|---|
| 2009/0286148 A1 | 11/2009 | Fujikawa et al. |
| 2013/0127473 A1 | 5/2013 | Ikeda |
| 2013/0209861 A1 | 8/2013 | Yong |
| 2014/0186693 A1* | 7/2014 | Tyler ................. H01M 10/6554 264/129 |
| 2015/0111069 A1 | 4/2015 | Han |
| 2015/0333323 A1* | 11/2015 | Umeyama ......... H01M 10/4235 429/61 |
| 2016/0104873 A1 | 4/2016 | Smythe |
| 2018/0212284 A1 | 7/2018 | Honda |
| 2020/0028199 A1 | 1/2020 | Yoshida |
| 2020/0036056 A1 | 1/2020 | Thomas |

FOREIGN PATENT DOCUMENTS

| | | |
|---|---|---|
| JP | 2006-294531 A | 10/2006 |
| JP | 2016-014592 A | 1/2016 |

* cited by examiner

METHOD FOR GENERATING SMOKE IN CELL PACK

The present invention relates to a method for generating smoke in a cell pack, and more particularly to a method for generating smoke in a cell pack having a plurality of unit cells. The present application is a continuation of U.S. application Ser. No. 18/244,683, filed Sep. 11, 2023, which is a continuation of U.S. application Ser. No. 15/967,677, filed May 1, 2018, now U.S. Pat. No. 11,799,139 issued on Oct. 24, 2023, which claims priority based on Japanese Patent Application No. 2017-091675 filed on May 2, 2017, the entire contents of which are hereby incorporated by reference.

BACKGROUND

1. Field of the Invention

2. Description of the Related Art

Cell packs including a plurality of unit cells in which a power storage element such as a lithium ion secondary cell, a nickel hydride cell or another secondary cell or capacitor serves as a unit cell have become increasingly important as power supplies to be installed on vehicles. The cell pack is configured by connecting a plurality of unit cells by connecting members (bus bars), and has external output terminals (a positive electrode output terminal and a negative electrode output terminal) of a positive electrode and a negative electrode for connection to an external device.

Vehicles equipped with such cell packs are required to have high safety, and for example, a durability test method and the like of a battery pack (cell pack), such as disclosed in Japanese Patent Application Publication No. 2016-14592, are carried out. In order to further improve the safety of the vehicle, the vehicle is provided with a smoke sensor for detecting smoke generation in the cell pack, and a notification device for notifying the occupant of the generation of smoke on the basis of the detection result of the smoke sensor.

Conventionally, in order to ensure highly accurate functioning of the notification device, an inspection test has been carried out to investigate the detection accuracy of the smoke sensor by artificially causing smoke generation in a cell pack, and, for instance, the smoke sensor sensitivity is set on the basis of the result of this test.

A method for artificially causing smoke generation in a cell pack (a method for generating smoke in a cell pack) in such an inspection test can be exemplified by a method of puncturing a cell pack with a sharp conductive member (for example, a metal nail) and causing the sharp member to penetrate through unit cells in the cell pack. With such a method for generating smoke, a unit cell generates smoke as a result of the conductive member short-circuiting the positive electrode and the negative electrode inside the unit cell. Other examples of the method for generating smoke include a method of setting the unit cell in an overcharged state and a method of heating the cell pack.

SUMMARY

In recent years, a demand for safety of vehicles equipped with cell packs has further increased, and it is necessary to stably provide smoke sensors capable of detecting smoke generation in a cell pack with higher accuracy than before. Specifically, when an actual cell pack generates smoke, usually one of the plurality of unit cells generates smoke, and then other unit cells generate smoke in a chain-like manner. Therefore, if it were possible to detect the smoke at an early stage of smoke generation when a very small amount of smoke is generated from a single unit cell, it would be possible to ensure enough time till a large amount of smoke is generated from a plurality of unit cells and to enable various countermeasures, thereby greatly contributing to the improvement of safety.

However, with the above-described conventional methods for smoke generation in a cell pack, it is difficult to generate a very small amount of smoke from a specific single unit cell and it is not possible to reproduce the smoke of the initial stage of smoke generation in the actual product. Therefore, the development of a novel method for smoke generation is desired.

For example, in a method of piercing a cell pack with a conductive member such as a nail, the cell case of the unit cell may be damaged and a lot of smoke may leak from the damaged portion. In this case, since more smoke is generated than at the initial stage of smoke generation in the actual product, the method can hardly be considered as suitable for inspecting and setting a smoke sensor for detecting very small amount of smoke at the initial stage of smoke generation.

Further, with the method for generating smoke by setting the cell to an overcharged state, there is a possibility that the abnormality of the unit cell will not be limited to smoke generation and will rapidly progress to ignition. Also, in this case, more smoke is generated than at the initial stage of smoke generation in the actual product.

In addition, since the unit cells provided in the cell pack are usually arranged close to each other, in the method of heating the cell pack with a heater, it is possible that a plurality of unit cells will be simultaneously heated to generate smoke, and smoke of the initial stage of smoke generation at which a very small amount of smoke is generated from a single unit cell cannot be reproduced.

The present invention has been created in view of the above-described circumstances, and it is a main objective thereof to provide a method for generating smoke in a cell pack by which a very small amount of smoke—such an amount that is generated at the initial stage of smoke generation in the actual product—can be generated from a specific single unit cell among a plurality of unit cells constituting the cell pack.

In order to achieve the above objective, the present invention provides a method for generating smoke in a cell pack having the following constitution.

The method for generating smoke in a cell pack disclosed herein causes smoke generation in a cell pack in which a plurality of unit cells, each having an electrode body accommodated in a cell case, are connected, and which includes a positive electrode output terminal for electrically connecting the positive electrode terminal of the unit cell and an external device, and a negative electrode output terminal for electrically connecting the negative electrode terminal of the unit cell and an external device.

In the method for generating smoke in a cell pack disclosed herein, by attaching a heating means to one of the positive electrode output terminal and the negative electrode output terminal to perform heating, the electrode body of a specific single unit cell is heated through the positive electrode output terminal or the negative electrode output terminal to which the heating means has been attached.

The inventors of the present invention have conducted a comprehensive study in order to achieve the abovementioned objective, and have come up with the method for generating smoke in a cell pack disclosed herein. This method will be described in detail below.

First, the inventors considered the method for generating smoke by heating, which is the most preferable among the above-described conventional methods for generating smoke, and studied improvement of the method for generating smoke by heating. Specifically, unlike the method for generating smoke by piercing with a conductive member such as a nail, the method for generating smoke by heating does not damage the cell case, so that it is possible to prevent the leakage of smoke from the damaged portion. Also, unlike the method for generating smoke by setting the overcharge state, there is no danger of the unit cell abnormality rapidly progressing to ignition. Therefore, the test can be conducted safely.

However, in the conventional method for generating smoke by heating, as described above, since a plurality of cells are heated at the same time and generates smoke, the initial stage of smoke generation in the actual product in which a specific single unit cell generates smoke and then other cells generate smoke in a chain-like manner is difficult to reproduce.

The inventors of the present invention have conducted further investigation by assuming that where this point could be improved and only a specific single unit cell, from among a plurality of unit cells included in a cell pack, could be adequately heated, it would be possible to generate a very small amount of smoke from the specific single unit cell in the same manner as at the initial stage of smoke generation in the actual product.

In this investigation, the inventors of the present invention focused their attention on the facts that the main cause of smoke generation in a unit cell is the internal short circuit of the electrode body (or the temperature rise of the electrode body material) and that the electrode body is connected to an external output terminal (positive electrode output terminal, negative electrode output terminal) via an electrode terminal (positive electrode terminal, negative electrode terminal).

Based on these facts, it was assumed that where a heating means could be attached to the external output terminal connected to the cell which is the object of smoke generation and heated, the electrode body of the unit cell which is the object of smoke generation would be directly heated via the external output terminal and the electrode terminal, thereby making it possible to cause smoke generation in a specific single unit cell from among a plurality of unit cells included in a cell pack.

The method for generating smoke in a cell pack disclosed herein is based on the above-described findings and involves attaching a heating means to one of the positive electrode output terminal and the negative electrode output terminal and heating, whereby a specific single unit cell is heated via the positive electrode output terminal and the negative electrode output terminal to which the heating means has been attached.

As a result, the temperature of the electrode body of the specific unit cell rises, a separator disposed between the positive and negative electrodes melts and the positive electrode and the negative electrode are short-circuited (or the electrode body is heated to a smoke generation temperature), so that the specific single unit cell can be adequately caused to generate smoke.

Further, since the method for generating smoke disclosed herein causes a unit cell to generate smoke by heating, for instance, leakage of smoke caused by the damage of the cell case and the occurrence of ignition in the unit cell caused by overcharging are prevented and the test can be carried out safely.

Therefore, with the method for generating smoke disclosed herein, it is possible to generate a very small amount of smoke from a specific single unit cell in the same manner as at the initial stage of smoke generation in the actual product and to inspect and set a smoke sensor with high accuracy. Thus, this method can greatly contribute to the improvement of safety of the vehicle equipped with the cell pack.

The application of the method for generating smoke in a cell pack disclosed herein is not limited to the inspection and setting of the above-described smoke sensor. The method for generating smoke disclosed herein can also be used, for example, for evaluating the heat resistance of a unit cell and investigating the trend of chain smoke generation in a plurality of cells. From this point, too, the method for generating smoke in a cell pack disclosed herein can contribute to the improvement of safety of the cell pack and cell performance.

In a preferred embodiment of the method for generating smoke in a cell pack disclosed herein, a plurality of unit cells are electrically connected in series by a connecting member, the positive electrode output terminal is connected to the positive electrode terminal of a unit cell arranged at a first end of the series connection, the negative electrode output terminal is connected to the negative electrode terminal of a unit cell arranged at a second end, and the heating means is attached to one of the positive electrode output terminal and the negative electrode output terminal and heated.

In the cell pack with such series connection, since the unit cells connected to the external output terminals (positive electrode output terminal and the negative electrode output terminal) are arranged at both ends in the connection direction, by heating one of the positive electrode output terminal and the negative electrode output terminal, it is possible to reliably heat a specific single unit cell and cause smoke generation therefrom.

In another preferred embodiment of the method of generating smoke in a cell pack disclosed herein, in a cell pack in which the plurality of unit cells are accommodated in a sealed container and a part of the positive electrode output terminal and a part of the negative electrode output terminal are exposed to the outside of the sealed container, the heating means is attached to a portion of the positive electrode output terminal or the negative electrode output terminal that is exposed to the outside of the sealed container.

Where the cell pack having the sealed container described above is heated from the outside of the sealed container, heat is diffused to a wide range through the sealed container. For this reason, with the conventional method for generating smoke by heating, it is particularly difficult to cause smoke generation in a specific single unit cell in the cell pack having a sealed container. In contrast, in the method for generating smoke of the above-described embodiment, the positive electrode output terminal (negative electrode output terminal) which is partially exposed to the outside of the sealed container for connection with the external device is heated. As a result, since the electrode body can be directly heated via the positive electrode output terminal (negative electrode output terminal), it is possible to easily cause smoke generation in a specific single unit cell even in a cell pack having a sealed container.

In a preferred embodiment of the method for generating smoke in a cell pack disclosed herein, the heating temperature created by the heating means is set to 200° C. to 250° C.

When heating the electrode body via the positive electrode output terminal (or the negative electrode output terminal) as in the method for generating smoke disclosed herein, the heating temperature to the electrode body is slightly lower than the heating temperature created by the heating means. Therefore, it is preferable to set the heating temperature created by the heating means to a temperature slightly higher than the melting temperature of the separator (or the smoke generation temperature of the electrode body material). For example, since the melting temperature of a general separator is 170° C. to 180° C., where the objective is to melt a separator to cause smoke generation, it is preferable to set the heating temperature created by the heating means to 200° C. to 250° C.

In a preferred embodiment of the method for generating smoke in a cell pack disclosed herein, the heating means is a heater provided with a heating wire wound around the positive electrode output terminal or the negative electrode output terminal.

From the viewpoint of heating the positive electrode output terminal (negative electrode output terminal) in a concentrated manner so as to prevent heat from diffusing to other unit cells, a heater provided with a heating wire wound around the positive electrode output terminal (negative electrode output terminal) can be advantageously used as the heating means.

In a preferred embodiment of the method for generating smoke in a cell pack disclosed herein, a current interrupting device for blocking a conduction path inside the unit cell when the unit cell is in an overcharged state is provided at at least one of the positive electrode terminal and the negative electrode terminal.

In recent years, in order to improve safety, a current interrupting device (CID) for blocking a conduction path in an overcharged state is sometimes provided at a positive electrode terminal (negative electrode terminal). In the method for generating smoke by overcharging described above, since this CID is actuated, it is impossible to cause smoke generation in a unit cell. Meanwhile, with the method for generating smoke disclosed herein, smoke generation can be caused in a specific single unit cell without actuating the CID. Therefore, this method can be advantageously applied to a cell pack provided with CID-equipped unit cells.

DESCRIPTION OF THE EMBODIMENTS

Figure 1:
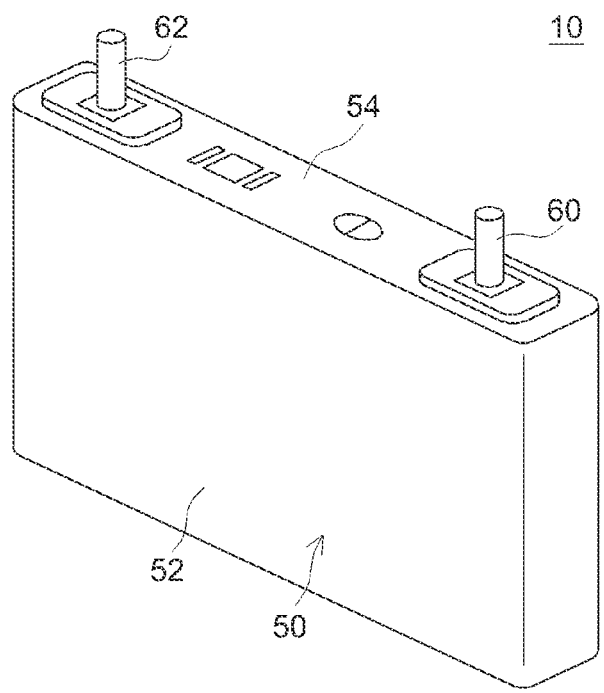
FIG. 1 is a perspective view schematically showing an example of a unit cell constituting a cell pack.

Preferred embodiments of the present invention will be described below with reference to the drawings as appropriate. In the following drawings, the same reference numerals are attached to members and parts that exhibit the same action. Further, the dimensional relationship (length, width, thickness, etc.) in each drawing does not reflect the actual dimensional relationship. Matters other than those particularly mentioned in the present specification and necessary for the implementation of the present invention can be grasped as design matters by a person skilled in the art on the basis of the related art in the pertinent field. The present invention can be carried out based on the contents disclosed in this specification and technical common sense in the pertinent field.

1. Structure of Cell Pack

In the present specification, the structure of the cell pack, which is the object of smoke generation in the method for generating smoke in a cell pack according to the present embodiment, will first be described. Such a cell pack has a plurality of unit cells of the following structure.

(1) Structure of Unit Cell

Figure 2:
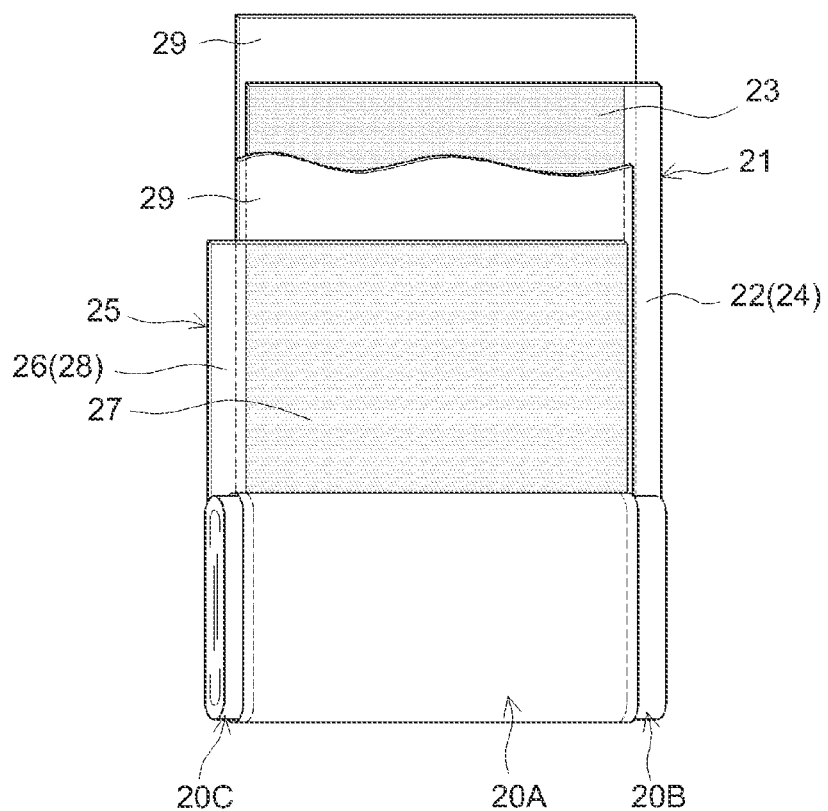
FIG. 2 is an explanatory view schematically showing an example of an electrode body used for a unit cell.

FIG. 1 is a perspective view schematically showing an example of a unit cell constituting a cell pack, and FIG. 2 is an explanatory view schematically showing an example of an electrode body used for a unit cell.

As shown in FIG. 1, a unit cell 10 includes a flat rectangular cell case 50, and an electrode body 20 (see FIG. 2) is accommodated in the cell case 50.

(A) Cell Case

As shown in FIG. 1, the cell case 50 is composed of a rectangular case main body 52 with an open upper surface, and a lid member 54 which closes the opening of the upper surface. It is preferable that the cell case 50 be made of, for example, metal, resin, or the like.

A pair of electrode terminals (a positive electrode terminal 60 and a negative electrode terminal 62) are provided at the lid member 54 forming the upper surface of the cell case 50. Specifically, as will be described hereinbelow, these positive electrode terminal 60 and negative electrode terminal 62 are elongated conductive members, a first end of which is exposed to the outside of the cell case 50. Although not shown, a second end of the positive electrode terminal 60 (negative electrode terminal 62) is electrically connected to the electrode body 20 inside the cell case 50. The positive electrode terminal 60 is preferably made of aluminum, an aluminum alloy, or the like, and the negative electrode terminal 62 is preferably made of copper, a copper alloy, or the like.

(B) Electrode Body

As shown in FIG. 2, the electrode body 20 is formed by laminating an elongated sheet-shaped positive electrode 21 and an elongated sheet-shaped negative electrode 25, with a separator 29 interposed therebetween, and then winding the laminated body.

The positive electrode 21 of the electrode body 20 is configured by providing a positive electrode mix layer 23 including a positive electrode active material, a conductive agent, and the like to the surface of a positive electrode current collector 22 made of an elongated sheet-shaped aluminum foil or the like. Further, on one side edge portion in the width direction of the positive electrode 21, a positive electrode current collector exposed portion 24, which is not provided with the positive electrode mix layer 23, is formed.

The negative electrode 25 is configured by providing a negative electrode mix layer 27 including a negative electrode active material and the like to the surface of a negative electrode current collector 26 made of an elongated sheet-shaped copper foil or the like. At one side edge portion in the width direction of the negative electrode 25, a negative electrode current collector exposed portion 28, which is not provided with the negative electrode mix layer 27, is formed.

The same materials as those conventionally used for lithium ion secondary cells can be used without particular limitation as the materials for the positive electrode 21 and the negative electrode 25 described above, and the present invention is not particularly limited thereby. Therefore, the explanation of these materials is herein omitted.

A wound core portion 20A in which the positive electrode mix layer 23 and the negative electrode mix layer 27 are wound is formed at the center portion of the electrode body 20 in the winding axis direction, and a charge-discharge reaction is mainly performed in the wound core portion 20A. On one side edge portion of the electrode body 20, the positive electrode current collector exposed portion 24 is wound in the winding axis direction, and a positive electrode terminal connecting portion 20B connected to a second end of the positive electrode terminal 60 (see FIG. 1) is formed. Further, on the other side edge portion, a negative electrode current collector exposed portion 28 is wound, and a negative electrode terminal connecting portion 20C connected to a second end of the negative electrode terminal 62 (see FIG. 1) is formed.

As will be described in detail hereinbelow, in the method for generating smoke according to the present embodiment, the electrode body 20 in the cell case 50 is heated via the positive electrode terminal 60 (negative electrode terminal 62). Therefore, from the viewpoint of efficiently transmitting the heat from the positive electrode terminal 60 (negative electrode terminal 62) to the electrode body 20, it is preferable that the connection portion between the positive electrode terminal 60 and the positive electrode terminal connecting portion 20B (connection portion between the negative electrode terminal 62 and the negative electrode terminal connecting portion 20C) be joined by a joining means having high thermal conductivity, for example, such as ultrasonic welding or laser welding.

Further, a porous sheet (film) having a function of electrically insulating the positive electrode 21 and the negative electrode 25 and passing lithium ions is used for the separator 29. A resin material having a predetermined heat resistance (specifically, a melting point of 100° C. to 300° C., and preferably 170° C. to 180° C.) can be preferably used for such a separator 29. Examples of the resin material suitable for such a separator 29 include polyethylene (PE), polypropylene (PP), polyesters, cellulose, polyamides, and the like. Further, the separator 29 may be formed by laminating a plurality of porous sheets formed of different resins.

Although not shown, an electrolytic solution is also accommodated, in addition to the electrode body 20 described above, in the cell case 50 shown in FIG. 1. Such an electrolytic solution is prepared by dissolving a supporting salt in a predetermined solvent, but since conventionally used solvent and supporting salt can be used without any particular limitation therefor, description thereof is herein omitted.

(2) Structure of Cell Pack

Figure 3:
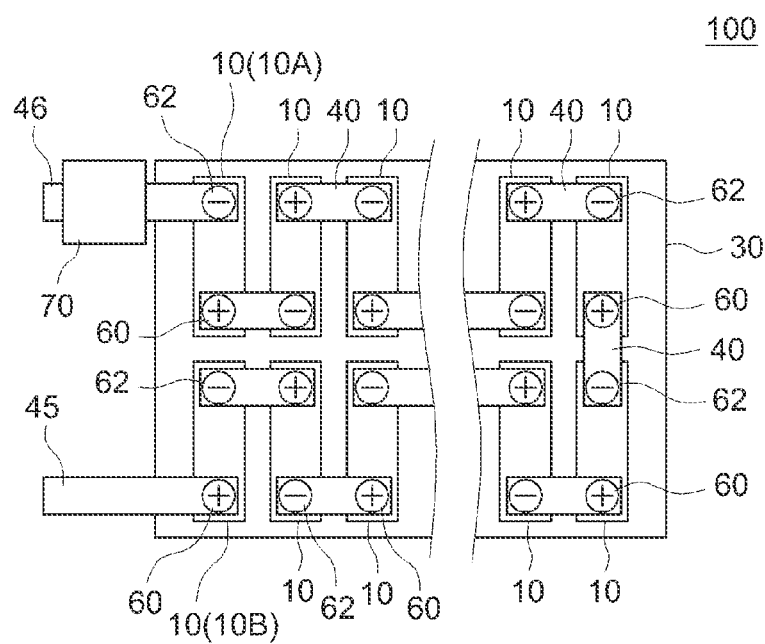
FIG. 3 is a plan view illustrating a method for generating smoke in a cell pack according to an embodiment of the present invention.

Next, a cell pack including a plurality of the above-described unit cells 10 will be described. FIG. 3 is a plan view for explaining the method for generating smoke in a cell pack according to the present embodiment. As shown in FIG. 3, a cell pack 100, which is the object of the method for generating smoke according to the present embodiment, has a plurality of the unit cells 10 of the above-described structure, and the unit cells 10 are connected to each other by connecting members 40.

The cell pack 100 shown in FIG. 3 is the so-called series-connected cell pack in which a plurality of the unit cells 10 are connected in series by connecting members 40. In such a series-connected cell pack 100, the unit cells 10 are arranged with alternate orientations so that the positive electrode terminal 60 and the negative electrode terminal 62 are brought close to each other between two adjacently arranged unit cells 10. The positive electrode terminal 60 of one of the unit cells 10 and the negative electrode terminal 62 of the other unit cell 10 are sequentially connected by the connecting members 40.

The connecting member 40 is a plate-like conductive member. Although not shown, terminal insertion holes are formed in both end portions of the connecting member 40. After inserting the positive electrode terminal 60 (or the negative electrode terminal 62) of the unit cell 10 through the terminal insertion hole, the connecting member 40 is connected by tightening a fixing nut.

In the cell pack 100, each of the unit cells 10 connected by the connecting members 40 is accommodated in the sealed container 30. Although not particularly limited, it is preferable that the sealed container 30 be made of a metal, a resin, or the like having a predetermined strength.

In the cell pack 100 shown in FIG. 3, the unit cells 10A and 10B disposed at both ends of the series connection are connected to an external device such as a motor of a vehicle. A negative electrode output terminal 46 (total-minus output terminal) which is to be electrically connected to the positive electrode of the external device is connected to the negative electrode terminal 62 of the unit cell 10A at a first end, among the unit cells 10A and 10B arranged at both ends. Further, a positive electrode output terminal 45 (total-plus output terminal) which is to be electrically connected to the negative electrode of the external device is connected to the positive electrode terminal 60 of the unit cell 10B at the second end. Further, the positive electrode output terminal 45 and the negative electrode output terminal 46 penetrate the sealed container 30 and are exposed to the outside.

2. Method for Generating Smoke in Cell Pack

Next, a method for generating smoke in a cell pack according to the present embodiment will be described.

As shown in FIG. 3, in the method for generating smoke according to the present embodiment, a heating means 70 is attached to a portion of the negative electrode output terminal 46 which is exposed to the outside of the sealed container 30, and the negative electrode output terminal 46 is heated by the heating means 70. General heating means can be used, without particular limitation, for the heating means 70, such a heating means being exemplified by a heater having a heating wire wound around the negative electrode output terminal 46. The heater having the heating wire can heat the negative electrode output terminal 46 in a concentrated manner, thereby preventing heat from diffusing to other unit cells 10.

When the negative electrode output terminal 46 is heated by the heating means 70, the electrode body 20 (see FIG. 2) of the unit cell 10A connected to the negative electrode output terminal 46 is heated.

Specifically, in the present embodiment, the heat applied by the heating means 70 is transmitted, via the negative electrode output terminal 46, to the negative electrode terminal 62 of the unit cell 10A arranged in the sealed container 30. As described above, the negative electrode terminal 62 is connected to the negative electrode terminal connecting portion 20C (see FIG. 2) of the electrode body 20 inside the cell case 50. Therefore, the heat transmitted to the negative electrode terminal 62 is further transferred to the electrode body 20 to heat the electrode body 20. In this embodiment, when the temperature of the electrode body 20 is raised to a predetermined temperature, the separator 29 (see FIG. 2) is melted and the positive electrode 21 and the negative electrode 25 are short-circuited, so that the unit cell 10A generates smoke. Thus, according to the method for generating smoke of this embodiment, smoke can be generated by directly heating the electrode body 20 of a specific single unit cell 10A.

Further, unlike the method of piercing with a conductive member such as a nail, the method for generating smoke according to the present embodiment does not damage the cell case 50, and therefore reliably prevents a large amount of smoke from leaking from the damaged portion. Also, unlike the method for generating smoke by overcharging, the abnormality of the unit cell does not rapidly progress to ignition. Therefore, it is possible to safely carry out the test of the cell pack.

As described above, according to the method for generating smoke of the present embodiment, it is possible to generate smoke from a specific single unit cell in a very small amount about the same as at the initial stage of smoke generation in the actual product, so that it is possible to inspect and set a smoke sensor with high accuracy. As a result, it is possible to stably provide a highly accurate notification device capable of accurately detecting a very small amount of smoke at the initial stage of smoke generation and notifying a vehicle occupant thereof, so that it is possible to contribute greatly to the improvement of safety of the vehicle equipped with the cell pack.

Further, in the cell pack 200 shown in FIG. 3, as described above, each unit cell 10 is accommodated in the sealed container 30. A problem associated with the cell pack 200 having such a sealed container 30 is that since the sealed container 30 diffuses heat from the outside, a plurality of unit cells 10 are easily heated at the same time. However, in the method for generating smoke according to the present embodiment, since the electrode body 20 of the specific unit cell 10A can be directly heated by the transfer of heat from the negative electrode output terminal 46, it is possible to appropriately heat and cause only the specific single unit cell 10A to generate smoke even in the cell pack 200 having such a sealed container 30.

Further, unlike the method for generating smoke by overcharging, the method for generating smoke according to the present embodiment can adequately cause smoke generation, without actuating a current interrupting device (CID) even when the CID is provided at the positive terminal (or negative terminal) of the unit cell. Therefore, the method for generating smoke according to the present embodiment can be particularly advantageously used for a cell pack including a unit cell equipped with a CID.

The heating temperature created by the heating means 70 is preferably set so that the unit cell 10A, which is the object to be heated, can be suitably caused to generate smoke. More specifically, since the heat applied from the heating means 70 is cooled while being transmitted through the negative electrode output terminal 46 and the negative electrode terminal 62, the heating temperature to the electrode body 20 becomes somewhat lower than the heating temperature created by the heating means 70.

Therefore, when the objective is to cause smoke generation by melting the separator 29, it is preferable to set the heating temperature created by the heating means 70 to a temperature somewhat higher than the melting temperature of the separator 29. For example, when a resin having a melting temperature of 170° C. to 180° C. is used for the separator 29, it is preferable to set the heating temperature created by the heating means 70 to 200° C. to 250° C. Accordingly, it is possible to appropriately melt the separator 29 so as to appropriately generate smoke due to a short circuit between the positive electrode 21 and the negative electrode 25.

Further, in the above description, the electrode body 20 is caused to generate smoke by short-circuiting the positive and negative electrodes by melting of the separator 29. However, when the smoke generation temperature of the constituent material (the positive electrode 21, the negative electrode 25, and the like) of the electrode body 20 is lower than the melting temperature of the separator 29, where the electrode body 20 is heated to the smoke generation temperature of the constituent material of the electrode body 20, the unit cell 10A generates smoke. Therefore, it is preferable to set the temperature of the heating means 70 in consideration of the smoke generation temperature of the constituent material of the electrode body 20.

3. Another Embodiment

The method for generating smoke in a cell pack disclosed herein is not limited to the above embodiment, and can be changed variously.

For example, in the above-described embodiment, the heating means 70 is attached to the negative electrode output terminal 46, and the electrode body 20 of the unit cell 10A connected to the negative electrode output terminal 46 is heated. However, the heating position in the method for generating smoke disclosed herein may be at one of the positive electrode output terminal 45 and the negative electrode output terminal 46. For example, the heating means 70 may be attached to the positive electrode output terminal 45 in FIG. 3. Even in this case, it is possible to generate a very small amount of smoke same as in the actual product by properly heating the electrode body 20 of the specific single unit cell 10B.

Figure 4:
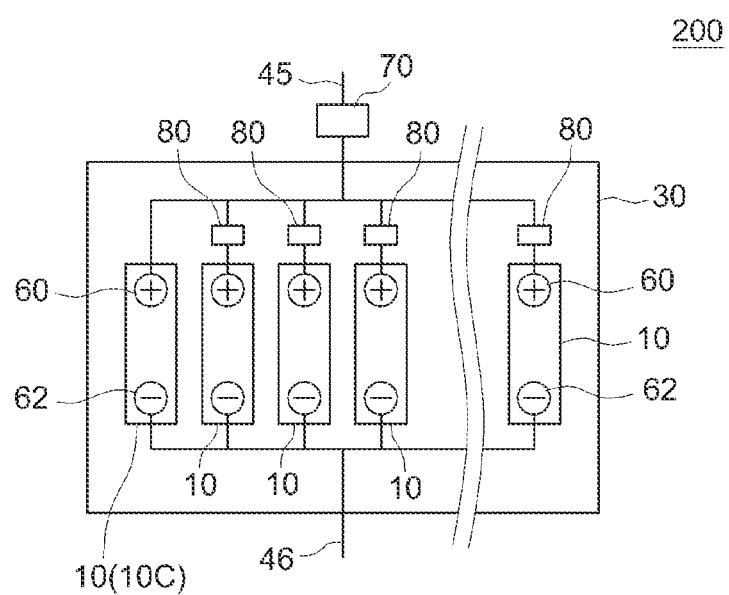
FIG. 4 is a plan view illustrating a method for generating smoke in a cell pack according to another embodiment of the present invention.

Further, in the above-described embodiment, the object of smoke generation is a series-connected cell pack, but the method for generating smoke in a cell pack disclosed is also applicable to the cell pack 200 with parallel connection such as shown in FIG. 4.

In the parallel-connected cell pack 200, the positive electrode output terminal 45 is connected to the positive electrode terminal 60 of each of the plurality of unit cells 10, and the negative electrode output terminal 46 is connected to the negative electrode terminal 62. When the parallel-connected cell pack 200 is the object of smoke generation, a heat absorbing material 80 is attached close to the unit cell 10 other than the unit cell 10C which is the object of smoke generation (for example, to the negative electrode output terminal 46 close to the unit cell 10) before sealing the sealed container 30. Then, the heating means 70 is attached to the portion of the negative electrode output terminal 46 exposed to the outside of the sealed container 30 and heating is performed. As a result, the electrode body of the unit cell 10C, which is the object of smoke generation, is heated in a concentrated manner. Therefore, the specific single unit cell 10C can be adequately caused to generate smoke.

Further, in all of the above-described embodiments, the object of smoke generation is a cell pack having a sealed container, but the method for generating smoke disclosed herein can naturally be applied to the cell pack not having the sealed container. Further, when a parallel-connected cell pack is not provided with a sealed container, it is possible to cause appropriately smoke generation in a specific single unit cell by simply attaching a heating means to a negative electrode output terminal (or a positive electrode output terminal) in the vicinity of a unit cell which is the object of smoke generation. In this case, by contrast with the cell pack such as shown in FIG. 4, it is not necessary to attach a plurality of heat absorbing materials 80. Therefore, the specific single unit cell can be easily caused to generate smoke.

TEST EXAMPLE

Hereinafter, test examples relating to the present invention will be described, but the following test examples are not intended to limit the present invention.

1. Explanation of Each Test Example (1) Test Example 1

(A) Construction of Test Cell Pack

An elongated sheet-shaped positive electrode was prepared in which a positive electrode mix layer in which a positive electrode active material ($LiNi_{1/3}Co_{1/3}Mn_{1/3}O_2$), a conductive material (acetylene black), and a binder (PVDF) were mixed at a mass ratio of 94:3:3 was formed on both sides of a positive electrode current collector (aluminum foil) having a thickness of 12 μm. An elongated sheet-shaped negative electrode was also prepared in which a negative electrode mix layer in which a negative electrode active material (graphite), a thickener (CMC), and a binder (SBR) were mixed at a mass ratio of 98:1:1 was formed on both sides of a negative electrode current collector (copper foil) having a thickness of 10 μm.

Then, the positive electrode and the negative electrode were laminated with a separator having a three-layer structure of PP/PE/PP (melting point: 170° C.) interposed therebetween, and then the laminate was wound to prepare a wound electrode body. The wound electrode body was accommodated together with an electrolytic solution in an angular cell case (width W 148 mm, thickness D 26.4 mm, height H 91 mm) as shown in FIG. 1 to produce a unit cell having a capacity of 25 Ah.

Then, in Test Example 1, a total of 96 of the above-described unit cells were produced, the unit cells were connected in series by using copper connecting members as shown in FIG. 3, a positive electrode output terminal made of copper was connected to a unit cell arranged at the first end of the series connection, and a negative electrode output terminal made of copper was connected to a unit cell arranged at the second end. Then, the unit cells were accommodated in a transparent sealed container, and the positive electrode output terminal and the negative electrode output terminal were exposed to the outside of the sealed container to construct a cell pack for testing.

(B) Smoke Generation Test

Next, in Test Example 1, the cell pack thus produced was charged to state of charge (SOC) 100% by constant-current constant-voltage (CC-CV) charging under a room temperature environment (about 25° C.). Then, a heating wire was wound around a portion of the negative electrode output terminal exposed to the outside of the sealed container, and the negative electrode output terminal was heated until smoke generation at 300° C. Then, the number of unit cells that generated smoke during heating and the amount of generated smoke (smoke generation amount) were visually observed.

(2) Test Example 2

In Test Example 2, the construction of the cell pack and the smoke generation test were carried out and the number of unit cells that generated smoke during heating and the amount of generated smoke were visually observed in the same manner as in Test Example 1, except that a unit cell with a current interrupting device (CID) attached thereto was used to construct the test cell pack.

(3) Test Example 3

In Test Example 3 the construction of the cell pack and the smoke generation test were carried out and the number of unit cells that generated smoke during heating and the amount of generated smoke were visually observed in the same manner as in Test Example 1, except that a method of piercing the cell pack with an iron nail so as to penetrate one of the plurality of unit cells constituting the cell pack was performed.

(4) Test Example 4

In Test Example 4, the construction of the cell pack and the smoke generation test were carried out and the number of unit cells that generated smoke during heating and the amount of generated smoke were visually observed in the same manner as in Test Example 3, except that a unit cell with a current interrupting device (CID) attached thereto was used to construct the test cell pack.

(5) Test Example 5

In Test Example 5, the construction of the cell pack and the smoke generation test were carried out and the number of unit cells that generated smoke during heating and the amount of generated smoke were visually observed in the same manner as in Test Example 1, except that a method of overcharging a single unit cell, among a plurality of unit cells constituting the cell pack, until smoke generation was performed.

(6) Test Example 6

In Test Example 6, the construction of the cell pack and the smoke generation test were carried out in the same manner as in Test Example 5, except that a unit cell with a current interrupting device (CID) attached thereto was used to construct the test cell pack.

(7) Test Example 7

In Test Example 7, the construction of the cell pack and the smoke generation test were carried out and the number of unit cells that generated smoke during heating and the amount of generated smoke were visually observed in the same manner as in Test Example 1, except that a method of heating a plurality of unit cells from the outside of the sealed container of the cell pack with a heater set at 400° C. was carried out in the smoke generation test.

(8) Test Example 8

In Test Example 8, the construction of the cell pack and the smoke generation test were carried out and the number of unit cells that generated smoke during heating and the amount of generated smoke were visually observed in the same manner as in Test Example 7, except that a unit cell with a current interrupting device (CID) attached thereto was used to construct the test cell pack.

2. Evaluation Results

The results of the smoke generation tests conducted in Test Examples 1 to 8 are shown in Table 1 below. In Test Example 6, since no smoke was generated even though the smoke generation test was continued, the test was stopped halfway.

TABLE 1

|  | Method for generating smoke | Presence of CID | Number of cells that generated smoke | Amount of generated smoke |
|---|---|---|---|---|
| Test Example 1 | Heating of negative electrode output terminal | Not present | 1 | Very small |
| Test Example 2 |  | Present | 1 | Very small |
| Test Example 3 | Piercing | Not present | 1 | Large |
| Test Example 4 |  | Present | 1 | Large |
| Test Example 5 | Overcharging | Not present | 1 | Large |
| Test Example 6 |  | Present | 0 | None |
| Test Example 7 | Heating of unit cell | Not present | 3 | Large |
| Test Example 8 |  | Present | 3 | Large |

According to the results shown in Table 1, in Test Example 1 in which the method for generating smoke by heating the negative electrode output terminal was performed, it was possible to appropriately generate smoke from a single unit cell connected to the negative electrode output terminal, and the amount of smoke generated from this unit cell was very small. Based on these results, it could be confirmed that, in the case of using the method for generating smoke by heating the negative electrode output terminal, it is possible to generate a very small amount of smoke from a specific single unit cell similarly to the initial stage of smoke generation in the actual product. The same result was obtained also in Test Example 2 using a unit cell having a CID.

Meanwhile, in Test Examples 3 and 4 in which the method for generating smoke by piercing with a nail was carried out, it was possible to generate smoke from a single unit cell pierced with the nail, but since a large amount of smoke generated in the cell case leaked from the damaged portion, the smoke generation amount increased. For this reason, when using the method for generating smoke by piercing with a nail, it was impossible to generate a very small amount of smoke such as at the initial stage of smoke generation in the actual product.

In Test Example 5 in which the method for generating smoke by overcharging was performed, it was possible to generate smoke from a specific single unit cell, but a large amount of smoke was confirmed. This is presumably because an abnormality of the electrode body inside the cell case was not limited to smoke generation and progressed to ignition. In Test Example 6, no smoke was generated at all. This is presumably because the CID was actuated during the smoke generation test.

In Test Examples 7 and 8 in which the smoke generation test by heating was performed, since smoke was generated simultaneously from three cells, the amount of smoke increased. This is apparently because the heat from the heater dispersed and a plurality of cells were simultaneously heated.

Although specific examples of the present invention have been described in detail above, these are merely illustrative and do not limit the scope of the claims. Techniques described in the claims include those in which the concrete examples exemplified above are variously modified and changed.

What is claimed is:

1. A method for setting a sensitivity of a smoke sensor based on smoke generated in a cell pack,
the cell pack comprising:
a plurality of unit cells, each having an electrode body formed by interposing a separator between a positive electrode and a negative electrode, and a cell case for accommodating the electrode body;
connecting members for connecting each of the plurality of unit cells;
a sealed container for accommodating the plurality of unit cells connected by the connecting members;
a positive electrode output terminal for electrically connecting a positive electrode terminal of one of the plurality of unit cells and an external device, a portion of which is exposed to the outside through the sealed container; and
a negative electrode output terminal for electrically connecting a negative electrode terminal of one of the plurality of unit cells and the external device, a portion of which is exposed to the outside through the sealed container,
the method comprising:
attaching a heating means to the portion exposed to the outside of the sealed container on one of the positive electrode output terminal and the negative electrode output terminal to perform heating;
heating the electrode body of a specific single unit cell of the plurality of unit cells through the positive electrode output terminal or the negative electrode output terminal to which the heating means has been attached;
generating smoke from the specific single unit cell by the short-circuit between the positive electrode and the negative electrode due to melting the separator; and
setting a sensitivity of the smoke sensor such that the smoke sensor is configured to detect the smoke generated from only the specific single unit cell among the plurality of unit cells included in the sealed container,
wherein the setting of the sensitivity of the smoke sensor comprises:
changing the sensitivity of the smoke sensor so that the smoke sensor reacts to the smoke generated from the specific single unit cell; and
setting the sensitivity of the smoke sensor based on a sensitivity when the smoke sensor reacted,
a melting temperature of the separator is 170° C. to 180° C., and a heating temperature created by the heating means is set to 200° C. to 250° C.

2. The method of claim 1, wherein, the plurality of unit cells are electrically connected in series by the connecting members, the positive electrode output terminal is connected to a positive electrode terminal of a unit cell arranged at a first end of the series connection and the negative electrode output terminal is connected to a negative electrode terminal of a unit cell arranged at a second end, and the heating means is attached to one of the positive electrode output terminal and the negative electrode output terminal and heated.

3. The method of claim 1, wherein the heating means is a heater provided with a heating wire wound around the positive electrode output terminal or the negative electrode output terminal.

4. The method of claim 1, wherein a current interrupting device for blocking a conduction path inside one of the plurality of unit cells when one of the plurality of unit cells is in an overcharged state is provided at at least one of the positive electrode terminal and the negative electrode terminal.

* * * * *